March 26, 1929. A. ROSENTHAL 1,706,823
CORN PICKER AND HUSKER
Filed Oct. 16, 1926 4 Sheets-Sheet 3

Patented Mar. 26, 1929.

1,706,823

UNITED STATES PATENT OFFICE.

AUGUST ROSENTHAL, OF WEST ALLIS, WISCONSIN, ASSIGNOR TO ROSENTHAL MANUFACTURING CO., OF WEST ALLIS, WISCONSIN.

CORN PICKER AND HUSKER.

Application filed October 16, 1926. Serial No. 141,988.

This invention pertains to improvements in corn pickers and huskers.

Heretofore numerous attempts have been made to produce a practical machine for picking and husking corn in the field, but these have proven impractical due to various objectionable features, such as complicity of structure, excessive weight, or the amount of power required to operate the same.

It is therefore the primary object of the present invention to provide a comparatively simple, light, inexpensive and efficient machine adapted to pick ears of corn from the standing stalks in the field, and thereafter husk and deliver the ears to a point from which they may be discharged into a trailer, or other suitable receptacle.

It is also an object to provide a machine of the foregoing character, wherein novel means is provided for collecting the kernels accidentally separated from the ears of corn during either the picking or husking operations, and eliminating the husks.

A further object incidental to the foregoing, is to utilize gravity in transferring the ears from the picker rolls, to, and through, the husking mechanism, thus eliminating mechanical feeds, or conveyors.

Another object is to provide gathering means adapted to guide the stalks into the machine, as the same is propelled forwardly, and bend them rearwardly to a more parallel position with relation to the picking rolls, thus utilizing the full length of the rolls in the picking operation and facilitating the passage of the stalks through the rolls, whereby the speed at which the machine may be operated is materially increased.

A more specific object is to provide means for supporting the ears as the stalks travel into the machine, whereby the ears are prevented from becoming separated from the stalks prior to the picking operation.

A still further object is to provide means between the picking and husking rolls to assist in guiding the stalks through the picking rolls, and to prevent their engagement with the husking rolls.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In that form of the present invention illustrated in the accompanying drawings, the same is designed for attachment to any conventional type of tractor, the latter not being shown. It will, however, be apparent that the principles embodied might readily be applied to a horse-drawn, or a self-propelled implement, without departing from the invention.

Proceeding with the description of the structure disclosed in the accompanying drawings, the numeral 1 designates a main frame having extended therefrom the usual dividers 2, which straddle the row of corn and guide the same to the gathering chains 2' carried thereby. The gathering chains comprise two sets $a$ and $b$, respectively, the set $b$ extending rearwardly and terminating at a point adjacent the forward ends of the picking rolls, while the set $a$ extends over the picking rolls to assist in the feed of the stalks through the picking rolls, in the manner to be hereinafter described.

Figure 7:
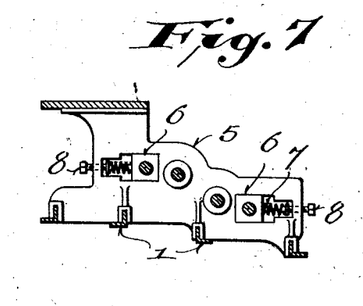
Figure 7 is a detail view of the head which carries one end of the picking and husking rolls, the same being taken on the line 7—7 of Figure 3.
Figure 8:
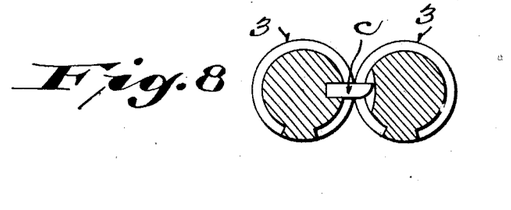
Figure 8 is an enlarged transverse section through the picking rolls.

The picking rolls 3 are of conventional structure embodying spiral ribs and provided with longitudinal ribs to facilitate snapping the ears from the stalks as the latter travel through the rolls. The rolls 3 are journaled at their forward ends in the brackets 4 carried on the main frame, and at their rear ends in the cross head 5, one of the rolls being journalled in a stationary bearing, while the other is mounted in a sliding bearing 6 which is normally urged toward the stationary bearing by the spring 7, the same being adjusted by means of the bolt 8 to retain the desired tension, as best shown in Figure 7. Inasmuch as the picking rolls are designed to discharge the separated ears laterally, it has been found expedient to position the axis of one of the rolls slightly below that of the adjacent roll. This arrangement materially facilitates the proper discharge of the ears from the picking rolls. To further assist in this operation the radial pins or lugs $c$ are secured to the highest one of the rolls, which pins exert a wiping action against the ears forcing them off the rolls.

Figures 1, 9:
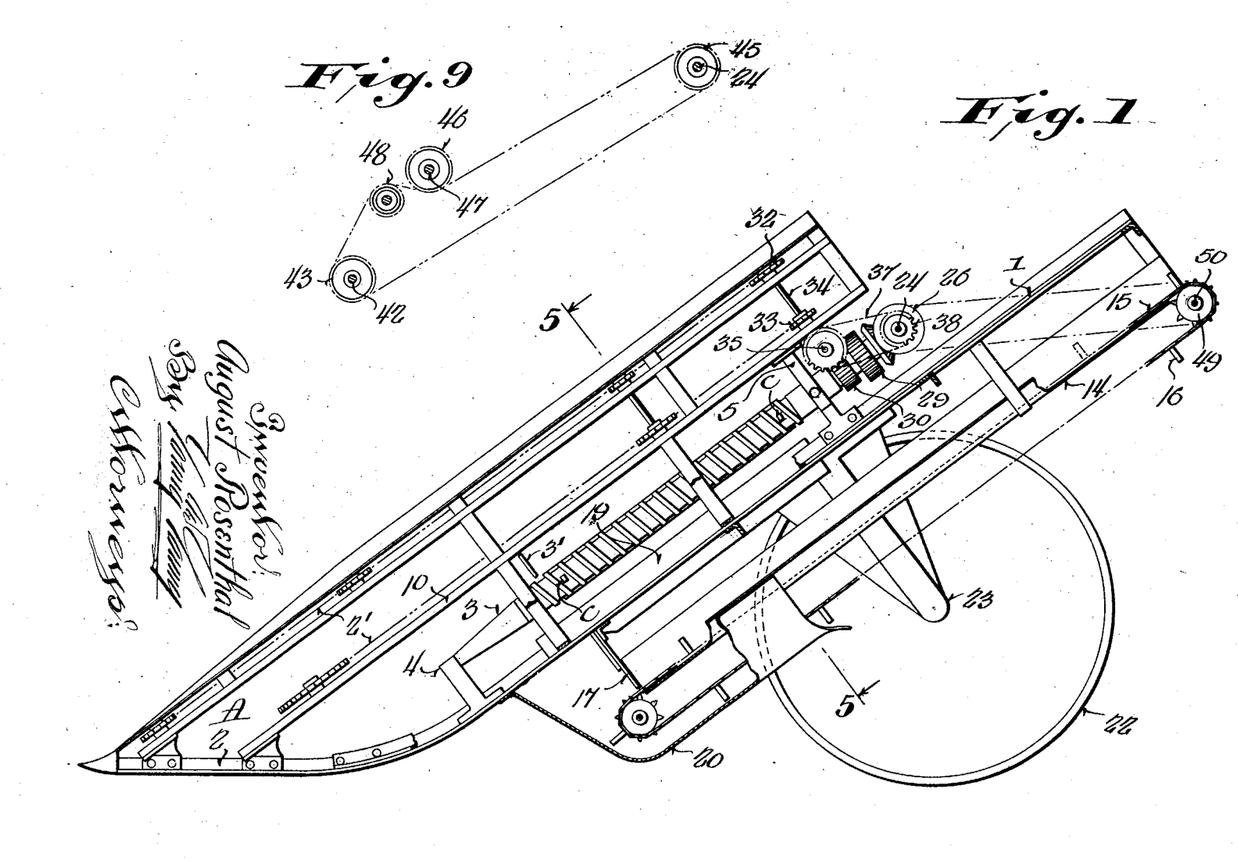
Figure 1 is a side elevation of a machine constructed in accordance with the present invention, with parts being broken away and in section to more clearly illustrate the structural details.
Figure 9 is a diagrammatic view illustrating one of the drives, the same being indicated by the line 3—3 of Figure 3.
Figure 2:
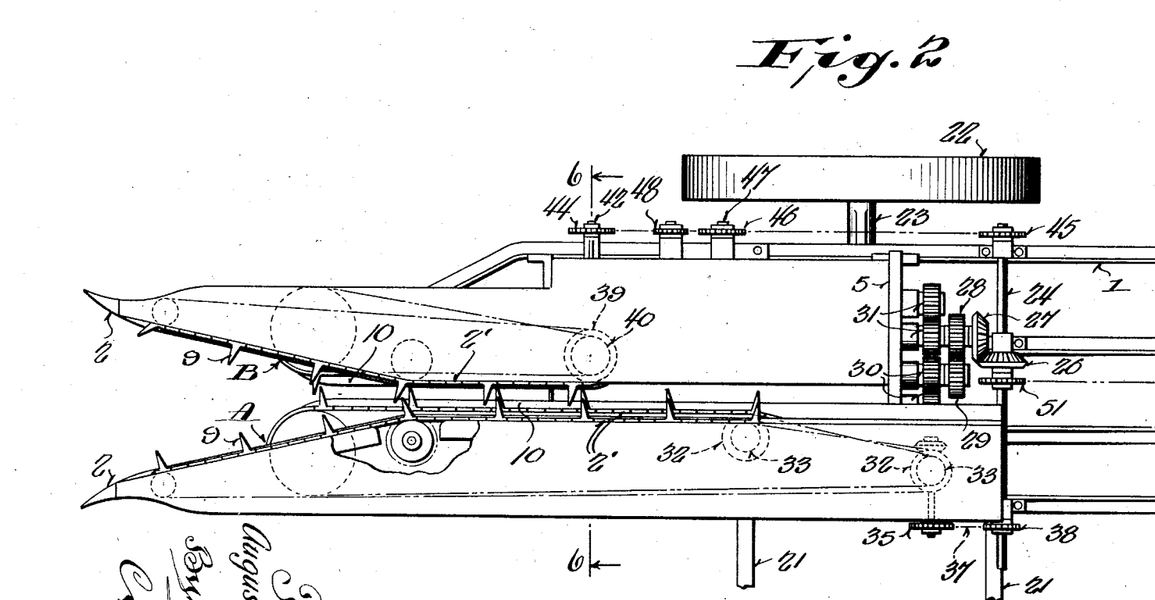
Figure 2 is a plan view.
Figure 5:
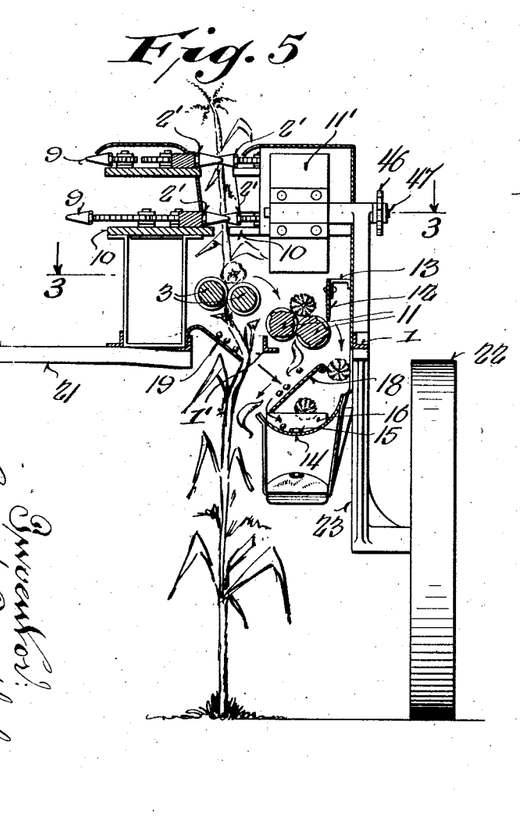
Figure 5 is a transverse section taken on the line 5—5 of Figure 1.
Figure 6:
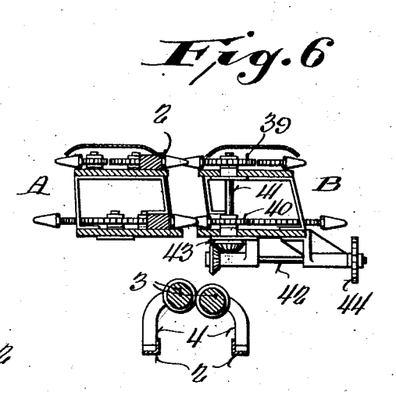
Figure 6 is a similar section taken on the line 6—6 of Figure 3.

Both sets of gathering chains $a$ and $b$ are of the ordinary link type provided with lugs 9, which, throughout certain portions of the stretches of the chain, overlap with the lugs of the adjacent chain to feed the stalks rearwardly into the machine. Each set comprises a pair of chains, one positioned above the other and carried by sprockets mounted upon longitudinal shelves. As best shown in Figures 2, 5, and 6, the lower shelves 10 are spaced sufficient apart to permit the stalks to travel therebetween, and at the same time support the ears carried by the stalks, to prevent them from becoming accidentally broken off. As best shown in Figure 2, one of the shelves terminates closely adjacent the forward ends of the snapping rolls 3 to permit the ears to be engaged by the rolls at that point and throughout their entire length.

From the foregoing it will be seen that any ears, which become accidentally detached from the stalks after the same enter the gathering chains, will be received by the shelves 10, and thereafter carried to the picking rolls by lugs 9 of the gathering chains 2'.

Secured to the frame above the lower ends of the picking rolls is a flexible flap 3' arranged to permit passage of the stalks to the picking rolls, and at the same time prevent any possibility of the snapped or separated ears from being discharged at the bottom of the picking rolls.

Positioned adjacent one side of the picking rolls and slightly below the same are a pair of husking rolls 11 of a conventional structure, having their lower ends carried by the frame 1, while their upper ends are carried by the cross-head 5, in a manner similar to the picking rolls, that is—one of the rolls is mounted in a stationary bearing, while the adjacent roll is journaled in the sliding bearing 6 normally urged towards the stationary bearing by the spring 7. Like the snapping rolls, the husking rolls are journalled one below the other to facilitate the lateral discharge of the ears therefrom. A conventional type of beater 11' is positioned above the husking rolls and rotates in a reverse direction to the travel of the ears of corn upon the husking rolls, thus serving to prevent the ears from traveling down the rolls one upon the other, or too rapidly to permit proper husking.

Figures 3, 4:
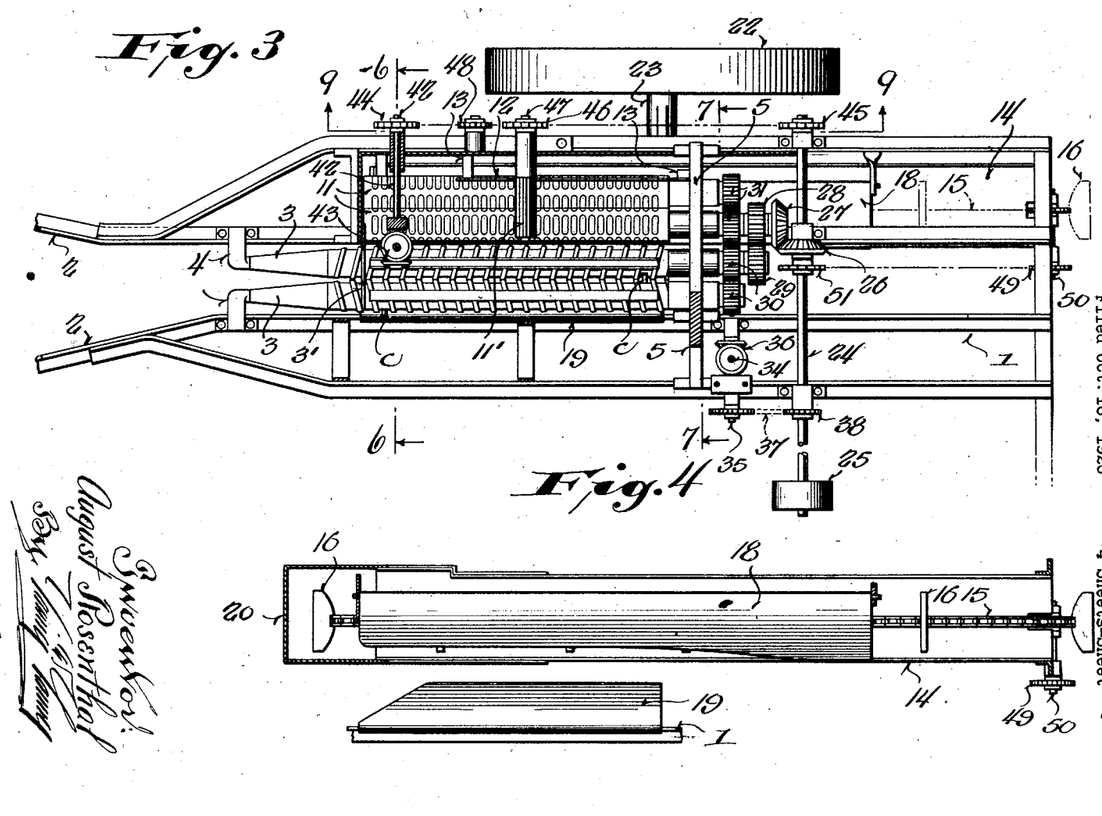
Figure 3 is a plan sectional view taken on the line 3—3 of Figure 5.
Figure 4 is a detail plan sectional view of the conveyor for receiving the husked ears, and the aprons for guiding the separated kernels into the conveyor.

As best shown in Figures 3 and 5 a guide 12 is positioned adjacent and parallel to the husking rolls and serves to prevent the ears of corn from being discharged from the rolls throughout the upper portion of their length, the guide terminating adjacent the lower end of the rolls to allow the corn, after reaching that point, to be discharged laterally. The guide 12 is preferably constructed of flexible material, such as leather or rubber, and is supported by brackets 13 carried by the main frame and the cross head. It will thus be seen that should the material become clogged upon the husking rolls, the guide 12 will give, permitting the material to be discharged laterally therefrom.

As the ears of corn are discharged laterally from the lower end of the inclined husking rolls, the same are received in the conveyor trough 14 positioned immediately below the husking rolls and extending parallel therewith. The usual chain conveyor 15 is carried by the trough 14 and is provided with paddles 15 which carry the ears of corn to the top of the trough, from which point they may be discharged into a trailer, or other suitable receptacle.

In order to prevent possible discharge of the ears from the lower end of the conveyor trough 14, as the ears are delivered thereto from the husking rolls, a flexible flap 17 is suspended from the frame 1 adjacent the lower end of the trough. The flap being flexible permits the paddles 16 to travel past, but at the same time prevents the ears of corn from leaving the trough.

During the picking and husking operations, particularly the latter, there is more or less tendency for kernels to become accidentally separated from the ears, depending upon the condition of the corn. It is therefore desirable to provide some means for collecting loose kernels during the above operations, and at the same time provide means to prevent discharge of the husks into the conveyor. This is accomplished in the present instance by an inclined apron 18 positioned immediately below the husking rolls and extending throughout their entire length, parallel thereto, but having its lower edge terminating short of the side of the conveyor trough 14, as shown in Figures 4 and 5. By this arrangement it will be seen that kernels of corn passing through the husking rolls will fall upon the apron 15 and thereafter slide down the same into the conveyor trough 14. At the same time the upper edge of the apron 18 terminates inside of the edge of the husking roll and leaves sufficient space for the ears discharged from the husking rolls, to pass into the conveyor trough under the apron.

In order to collect the kernels of corn separated during the picking operation, a similar apron 19 is secured to the main frame and extends under the picking rolls, as best shown in Figure 5. The kernels dropping through the picking rolls will engage the apron 19 and will be directed downwardly toward the apron 18 from which they are discharged into the conveyor trough in a similar manner to the kernels received from the husking rolls.

In order to protect the lower end of the conveyor chain 15, which is in close proximity to the ground, a housing 20 is built around the same and secured to the main frame 1. This housing, in addition to serving as a guard for the conveyor chain, also forms a pocket to receive kernels of corn which might be accidentally discharged from the lower end of the conveyor trough 14. Should the accumulation of kernels in the pocket become sufficient, the conveyor paddles will pick up a certain amount and carry them up the trough 14, from where they are discharged into the same receptacle receiving the husked ears. The kernels remaining in the bottom of the pocket may then be removed after the machine has completed its work.

Due to the close proximity of the picking and husking rolls it is necessary to provide means to assist in guiding the stalks through the picking rolls to prevent their entanglement with the husking rolls. This is accomplished by the guard 1', which is part of the main frame, and is positioned below and between the picking and husking rolls, extending parallel therewith, as best seen in Figure 5.

As previously explained, that form of the invention illustrated in the drawings is designed for attachment to a conventional type of structure. Therefore the main frame 1 is provided with lateral braces 21 extending from one side thereof for attachment to a conventional tractor in any suitable manner. The opposite side of the frame is supported by a wheel 22 carried by the bracket 23.

Taking up the drive for the various mechanisms, power is transmitted to the machine through the transverse shaft 24 mounted on the frame adjacent its upper end. The shaft 24 is provided with a pulley 25, which, in instances where the machine is attached to a tractor, may be connected by a belt, or in any other suitable manner, to the power pulley of the tractor. To drive the picking and husking rolls a bevel gear 26 is secured on the shaft 24 and meshes with a bevel gear 27 carried on the upper end of one of the husking rolls 11, which roll is also provided with a spur gear 28 meshing with a spur gear 29 secured on the upper end of the adjacent picking roll 3. The picking rolls are geared together by the spur gears 30 while the husking rolls are likewise connected by the spur gears 31. Thus it will be seen that the rolls of each set are driven toward one another to feed material downwardly therethrough.

The gathering chains comprising the set $a$ are driven by means of the sprockets 32 and 33, respectively, which are mounted upon the vertical shaft 34. The shaft 34 is in turn connected with the transverse shaft 35, by means of the beveled gear 36. The shaft 35, which is parallel with the transverse shaft 24, is provided with a sprocket gear 37 connected by means of a chain with the sprocket gear 38 mounted on the transverse shaft 24.

It will be noted that the gear 32, driving the upper gathering chain, is larger than the gear 33, thus serving to increase the speed of the upper chain, and causing the stalks to be bent rearwardly as they travel into the picking rolls.

The gathering chains comprising the set $b$ are driven in a similar manner by means of the sprockets 39 and 40, respectively, mounted on the shaft 41, which is connected with the transverse shaft 42 by means of bevelled gears 43. The shaft 42 is provided with a sprocket gear 44 in chain connection with the sprocket gear 45 mounted on the transverse shaft 24. Like the adjacent gathering chain, the upper chain of the set $b$ is driven at a greater speed than the lower chain, due to the fact that the drive sprocket 39 is of greater diameter. The sprocket chain, which connects the sprocket gears 44 and 45, also engages the sprocket gear 46, which is secured to the shaft 47 that carries the beater 11'. The idler gear 48 is employed to hold the sprocket chain in engagement with the sprocket gear 46, inasmuch as the latter engages the chain on the outer side of one of its stretches in order to obtain the proper direction of drive of the beater.

The conveyor chain 15 is driven by means of the chain connection between the sprocket gear 49 mounted on the shaft 50, which carries the upper end of the conveyor chain, and the sprocket 51 mounted on the shaft 24.

Taking up the operation of the machine, it will be readily seen that as the machine is propelled or drawn forwardly, the stalks of corn will pass in between the dividers and will be engaged by the gathering chains which pick up the broken stalks and hold the others in a more or less raised position as the same move into the machine. Due to the fact that the upper gathering chains of both sets are driven at a greater rate of speed than the lower chains, the stalks will be gradually bent rearwardly as they move into the picking rolls, with the result that they assume a position substantially parallel to the picking rolls 3. During the time the stalks are passing through the dividers and are engaged by the gathering chains, certain of the hanging ears will be supported by the lower shelves 10 which are spaced apart sufficiently to permit the stalks to pass therebetween, but close enough to support the ears. As the stalks enter the picking rolls 3, the ears are released from their support, due to the fact that one of the shelves 10 terminates adjacent the forward end of the picking rolls, and the stalks are then fed downwardly between the picking rolls causing the ears to be pinched or snapped therefrom. Because of the fact that the stalks are bent rearwardly as they pass downwardly through the picking rolls, it will be apparent that practically the entire length of the picking rolls will be utilized and due to the fact that the stalks are fed through the rolls axially, rather than transversely, the time required for such operation is materially reduced, which permits the speed at which the machine may be operated, to be materially increased.

After the ears have been snapped from the stalks by the roll 3, the same are prevented from being discharged from the lower end of the same, by means of the flexible flap 3' and are discharged laterally therefrom by the lugs c carried by one of the picking rolls. This action is materially facilitated by the fact that one of the picking rolls, over which the ears are to be discharged, is positioned somewhat below the other. From the picking rolls the ears are delivered to the husking rolls, which remove the husks in the well known manner employed by the present husking machines.

Due to the fact that the picking and husking rolls are positioned parallel and closely adjacent to each other, with the axis of each successive roll positioned below that of the preceding roll, a laterally and forwardly inclined chute is in effect provided, which permits rapid travel of the ears over the rolls to the conveyor by gravity.

As the husks pass through the rolls 11 they are discharged upon the inclined apron 18, and due to the fact that the space between the lower end of the apron and the conveyor trough 14 is considerably restricted, the husks will be prevented from entering the trough and will be discharged upon the ground.

During the husking operation the ears are held upon the rolls throughout the upper portion of their length by means of the flexible flap 12, which terminate adjacent the lower end of the rolls, permitting the ears to be discharged laterally at that point, this action being brought about in a similar manner to the discharge of the ears from the picking rolls, one of the husking rolls being positioned below the other, and one of the rolls being provided with lugs to engage the ears and force them laterally over the adjacent roll.

As the ears leave the husking rolls they pass down between the upper end of the inclined apron and the side of the conveyor trough 14, and then into the conveyor trough where they are carried upwardly by means of the conveyor chain 15. As previously explained, kernels of corn separated in the picking or husking operation, engage the aprons 19 and 18, respectively, and are delivered into the trough 14 from which they are discharged with the husked ears.

From the foregoing it will be seen that a comparatively apparently simple, inexpensive, compact, and exceedingly light structure has been provided, which actual operation has demonstrated will efficiently pick and husk corn in the field, very little traction and operating power being required. It will also be seen that very simple and novel means have been provided for transferring the ears from the picking rolls to and through the husking operation, as well as the provision of simple and efficient means for collecting the separated kernels and at the same time deflecting and eliminating the husks passing through the husking rolls.

Particular attention is directed to the compactness of structure, which is of vital importance in a machine of the present type. This is made possible by such features as bending the stalks rearwardly to utilize the full length of the picking rolls, thus requiring shorter rolls; the parallel arrangement of the husking rolls with relation to the picking rolls; the position of the conveyor with relation to the husking rolls; the manner of transferring the ears from the picking rolls through to the conveyor whereby mechanical feeds are eliminated; and the means for eliminating the husks, and collecting the separated kernels.

While one specific method of drive has been illustrated and described, obviously various arrangements may be utilized to accomplish the same results without affecting the operation of the various mechanisms.

I claim:—

1. A corn picking and husking machine comprising a pair of picking rolls, means for guiding standing stalks to the picking rolls, husking rolls positioned adjacent the picking rolls and parallel thereto, a conveyor to one side of the husking rolls for receiving the husked ears from the said rolls, and an apron positioned below the husking rolls to deflect the husks from the conveyor.

2. A corn picking and husking machine comprising a pair of picking rolls, means for guiding standing stalks to the picking rolls, husking rolls positioned adjacent the picking rolls and parallel thereto, a conveyor to one side of the husking rolls for receiving the ears from the said rolls, and an apron positioned below the husking rolls to direct separated kernels into said conveyor and deflecting the husks from said conveyor.

3. A corn picking and husking machine comprising, a pair of downwardly inclined picking rolls, means for guiding standing stalks to said rolls, husking rolls positioned adjacent and parallel to the picking rolls, the axis of each successive picking and husking roll being positioned below that of the preceding roll, and a conveyor for receiving the ears from the husking rolls.

4. A corn picking and husking machine comprising, a pair of picking rolls, means for guiding standing stalks to the picking rolls, husking rolls positioned adjacent the picking rolls to receive the ears therefrom, a conveyor positioned beneath the husking rolls for receiving the ears therefrom, means positioned below the husking rolls for deflecting the husks from the conveyor and directing separated kernels into the conveyor, and means positioned below the picking rolls to direct separated kernels to the means positioned between the husking rolls and conveyor.

5. A corn picking and husking machine comprising, a pair of inclined picking rolls, means for guiding the stalks to the picking rolls, means positioned adjacent the lower end of the picking rolls to permit passage of stalks therethrough and prevent the discharge of ears from the lower ends of the picking rolls, husking rolls positioned adjacent the picking rolls for receiving the ears therefrom, and a conveyor for receiving ears from the husking rolls.

6. A corn picking and husking machine comprising, a pair of inclined picking rolls, means for guiding the stalks to the picking rolls, means positioned adjacent the lower end of the picking rolls to permit passage of stalks therethrough and prevent the discharge of ears from the lower end of the picking rolls, husking rolls positioned adjacent the picking rolls for receiving the ears therefrom, a conveyor for receiving ears from the husking rolls, and means for deflecting the husked ears from said conveyor.

7. A corn picking and husking machine comprising, a pair of picking rolls, means for guiding standing stalks to the picking rolls, means for supporting the ears while travelling to the picking rolls, husking rolls positioned adjacent the picking rolls to receive the ears therefrom, and a conveyor for receiving the ears from the husking rolls.

8. A corn picking and husking machine comprising, a pair of picking rolls, means for guiding standing stalks to the picking rolls and bending the same rearwardly, husking rolls positioned adjacent the picking rolls to receive the ears therefrom, and a conveyor for receiving the ears from the husking rolls.

9. A corn picking and husking machine comprising a pair of picking rolls, two pairs of gathering chains for guiding standing stalks to the picking rolls, the top gathering chain of each pair being driven at a greater speed than the lower chain to bend the stalks rearwardly, husking rolls positioned adjacent the picking rolls to receive ears therefrom, and a conveyor for receiving the ears from the husking rolls.

10. A corn picking and husking machine comprising, a pair of picking rolls, means for guiding standing stalks to the picking rolls, husking rolls positioned adjacent the picking rolls for receiving the ears therefrom, a conveyor positioned below said husking rolls for receiving the ears therefrom, a laterally inclined apron positioned between said husking rolls and conveyor to deflect the husks from the conveyor and guide the separated kernels into the conveyor, and a second laterally inclined apron positioned below the picking rolls to direct separated kernels to the first mentioned apron.

11. A corn picking and husking machine comprising a pair of picking rolls, means for guiding the stalks to the picking rolls, husking rolls positioned adjacent the picking rolls for receiving the ears therefrom, an inclined conveyor for receiving the ears from the husking rolls, and a flexible flap positioned at the bottom of said conveyor to prevent the discharge of ears therefrom.

12. A corn picking and husking machine comprising, a pair of picking rolls, means for guiding standing stalks to the picking rolls, husking rolls positioned adjacent the picking rolls for receiving the ears therefrom, a conveyor for receiving the ears from the husking rolls, and a housing surrounding the lower end of the conveyor and forming a pocket to receive separated kernels from said conveyor.

13. A corn picking and husking machine comprising, a pair of picking rolls, means for guiding standing stalks to the picking rolls, husking rolls positioned adjacent the picking rolls to receive ears therefrom, a beater positioned above the husking rolls and rotated in opposite direction to the travel of ears on the husking rolls, a conveyor positioned beneath and parallel to the husking rolls for receiving ears therefrom, and means positioned between the husking rolls and conveyor to deflect husks from the conveyor and guide separated kernels into the conveyor.

14. A corn picking and husking machine comprising a pair of inclined picking rolls, means for guiding standing stalks to said picking rolls, flexible means positioned adjacent the lower end of the picking rolls to permit passage of stalks to the rolls and prevent the discharge of ears from the lower ends of the rolls, husking rolls positioned adjacent the picking rolls for receiving ears therefrom, means positioned above said husking rolls to retard the travel of ears thereon, and a conveyor for receiving ears from the husking rolls.

15. A corn picking and husking machine comprising, a pair of picking rolls, means for guiding standing stalks to the picking rolls, husking rolls positioned adjacent the picking rolls to receive the ears therefrom, means to prevent the discharge of ears from the husking rolls throughout the upper portion of their length, and a conveyor for receiving ears from the lower end of said husking rolls.

16. A corn picking and husking machine comprising, a pair of picking rolls, means for guiding standing stalks to the picking rolls, a pair of husking rolls position adjacent the picking rolls to receive ears therefrom, a flexible flap positioned adjacent the husking rolls and extending throughout the upper portion of their length to prevent discharge of the ears from the husking rolls, and a conveyor for receiving the ears discharged from the lower end of the husking rolls.

17. A corn picking and husking machine comprising, a pair of picking rolls, means for guiding standing stalks to the picking rolls, means for laterally discharging ears from the picking rolls, husking rolls positioned adjacent and to one side of the picking rolls for receiving ears therefrom, and a conveyor for receiving ears from the husking rolls.

18. A corn picking and husking machine comprising, a pair of picking rolls, means for guiding standing stalks to the picking rolls, a lug carried by one of the picking rolls to discharge the ears laterally therefrom, a pair of husking rolls positioned adjacent said picking rolls to receive the ears therefrom, and a conveyor for receiving the ears from the husking rolls.

19. A corn picking and husking machine comprising, a pair of picking rolls, one of said rolls having its axis positioned below the adjacent roll, a pair of husking rolls adjacent and parallel to the picking rolls to receive the ears therefrom, one of said husking rolls having its axis positioned below that of the adjacent roll, and a conveyor for receiving the ears from the husking rolls.

20. A corn picking and husking machine comprising, a pair of picking rolls, means for guiding stalks to the picking rolls, husking rolls positioned adjacent and parallel to the picking rolls to receive ears therefrom, a guard positioned below the picking rolls and extending parallel therewith to prevent entanglement of the stalks with the husking rolls, and a conveyor for receiving ears from the husking rolls.

21. A corn picking and husking machine comprising, a pair of picking rolls, gathering chains for guiding stalks to the inclined picking rolls, means for supporting the ears during their travel to the picking rolls, a flexible flap positioned adjacent the lower end of the picking rolls to permit passage of the stalks and prevent discharge of the ears from the lower ends of the picking rolls, husking rolls positioned adjacent and parallel to the picking rolls for receiving ears therefrom, means carried by the picking rolls for laterally discharging the ears therefrom, a flexible flap positioned adjacent and parallel to the husking rolls throughout the upper portion of their length, a conveyor for receiving ears from the husking rolls, an inclined apron positioned between said husking rolls and conveyor to deflect husks from the conveyor and guide separated kernels into the conveyor, and a second inclined apron positioned below the picking rolls for directing separated kernels to the first mentioned apron.

22. A corn picking and husking machine comprising, a pair of inclined picking rolls, two pairs of gathering chains for guiding standing stalks to the picking rolls, the top chain of each pair being driven at a greater speed than the lower chains to bend the stalks rearwardly, means for supporting the ears in their travel to the picking rolls, means carried by the picking rolls to discharge the ears laterally therefrom, a pair of husking rolls positioned adjacent and parallel to the picking rolls to receive ears therefrom, a beater positioned above the husking rolls and rotating in opposite direction to the travel of the ears on the husking rolls, a flexible flap positioned adjacent and parallel to the husking rolls and extending throughout the upper portion of their length, a conveyor positioned below the husking rolls and parallel thereto for receiving ears therefrom, an inclined apron positioned between the husking rolls and conveyor to deflect husks from the conveyor and direct separated kernels to the conveyor, a second apron positioned below the picking rolls to direct separated kernels to the first mentioned apron, and a housing surrounding the lower end of said conveyor to form a guard for the conveyor and a pocket for the reception of separated kernels from the conveyor.

In testimony that I claim the foregoing I have hereunto set my hand at West Allis, in the county of Milwaukee and State of Wisconsin.

AUGUST ROSENTHAL.